Sept. 15, 1964   D. M. PETERSON ET AL   3,148,605
FILM METERING MECHANISM
Filed Sept. 28, 1962
2 Sheets-Sheet 1

DEAN M. PETERSON
FREDRIC A. MINDLER
CHARLES E. PICKERING
INVENTORS

BY R. Frank Smith
Robert W. Hampton
ATTORNEYS

Sept. 15, 1964   D. M. PETERSON ET AL   3,148,605
FILM METERING MECHANISM
Filed Sept. 28, 1962   2 Sheets-Sheet 2

DEAN M. PETERSON
FREDRIC A. MINDLER
CHARLES E. PICKERING
INVENTORS

BY  R. Frank Smith
    Robert W. Hampton
           ATTORNEYS

United States Patent Office 3,148,605
Patented Sept. 15, 1964

3,148,605
FILM METERING MECHANISM
Dean M. Peterson, Fredric A. Mindler, and Charles E. Pickering, Rochester, N.Y., assignors to Eastman Kodak Company, Rochester, N.Y., a corporation of New Jersey
Filed Sept. 28, 1962, Ser. No. 226,990
5 Claims. (Cl. 95—31)

This invention relates to devices for metering film in roll film cameras, and more particularly relates to such devices used in conjunction with roll film that is perforated at predetermined metering intervals.

Devices for metering successive roll film exposures by arresting the film winding mechanism in response to the sensing of perforations or notches precut in the film at specifically chosen intervals, are old and well known in the photographic art. Generally, however, such devices have not been wholly satisfactory due to one or more of the following concomitant problems: too much strain on the film, causing scratching or tearing of the film and, more often, causing distortion of the film plane; insufficient braking or locking force resulting in a failure of positive arresting action permitting overdriving of film by the operator; metering failure caused by insufficient perforation-sensor travel due to unusual stiffness of paper backing; false metering and failure of accompanying double exposure prevention devices due to small tolerances necessitated by limited perforation sensor travel; and inability to test operate the camera due to the blocking of the film winding mechanism in the absence of film in the camera.

The invention herein provides a simple and economic mechanism which overcomes all of the above-listed prior art problems. Essentially, the invention herein utilizes a sensing member which is held against a surface of the film under relatively light pressure. When the sensing member (1) has engaged a film perforation or notch, and (2) has been moved along in the direction of film travel by the film, it releases an independently and heavily biased locking pawl which moves through a relatively large distance at a relatively high velocity to engage and lock a ratchet wheel which is integral with the camera's film drive. Movement by the locking pawl also frees the camera's shutter release lever, permitting the exposure of the film by the operator. Following an exposure, the locking pawl is automatically driven back to its cocked position where it once again prevents the operation of the camera's shutter release lever, and, at the same time, the sensing member is withdrawn from the perforation to a position in contact with the film surface, ready to sense and enage the next successive perforation as the film is advanced by the operator preliminary to the next exposure.

It is an object of this invention to provide a new and improved mechanism for metering film in a roll film camera utilizing film which has been perforated or notched at predetermined intervals.

Another object of the invention is to provide a device for metering roll film by utilizing the sensing of film perforations to positively block the camera's winding mechanism without submitting the film to strain sufficient to cause tearing, scratching, or distortion of the film plane.

Still another object is to magnify the movement of a member sensing perforations in roll film to provide lever action of sufficiently large movement and velocity to assure the positive blocking of the camera's film winding mechanism.

Yet another object is to provide a metering mechanism which senses perforations in roll film and which acts automatically and with sufficient movement and velocity to assure that the camera's film winding mechanism cannot be overdriven by the operator once the metering mechanism has operated to block further winding motion.

A further object of the invention is to provide a metering mechanism for roll film cameras which requires sufficient sensing member pressure and movement to prevent false metering.

A still further object is to provide a relatively simple and economical metering mechanism which senses perforations in roll film and which magnifies the movement of the film sensing member sufficiently to assure positive double-exposure prevention control.

Another object is to provide a metering mechanism for a roll film camera which will operate positively to block the camera's film winding mechanism when film is in the camera and the mechanism senses a perforation in the roll film being wound in the camera, and which also permits the camera to be test operated in the absence of film in the camera.

Other objects, purposes and characteristic features of the present invention will be in part obvious from the accompanying drawings, and in part pointed out as the description of the invention progresses. In describing the invention in detail, reference will be made to the accompanying drawings in which like reference characters designate corresponding parts throughout the several views, and in which.

Figure 1:
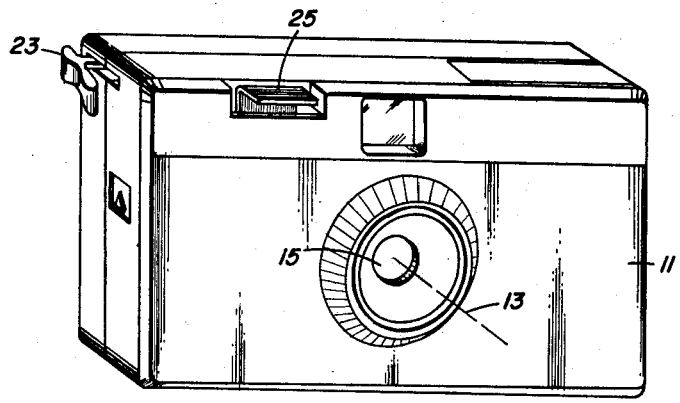
FIG. 1 is a simple roll film camera of the type that may incorporate the metering mechanism disclosed herein.
Figure 2:
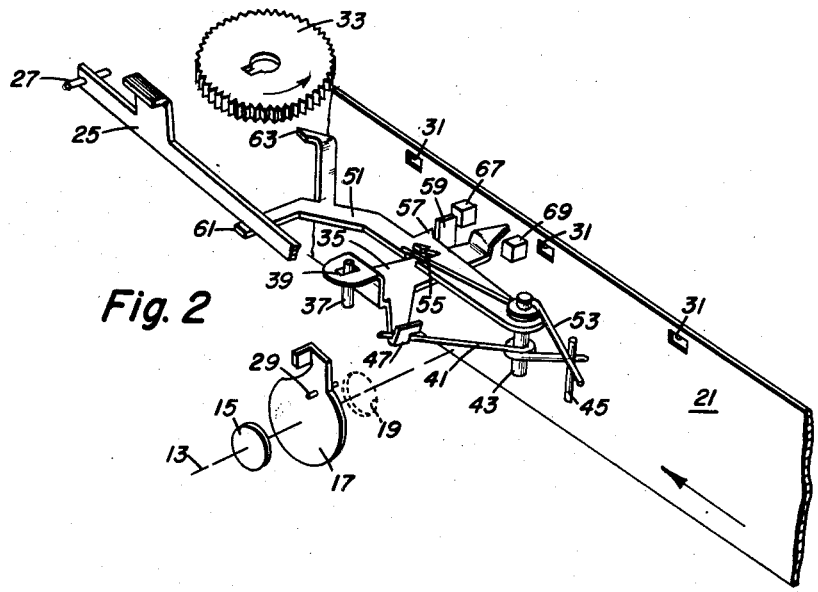
FIG. 2 is a simplified perspective drawing of the novel metering mechanism, omitting all camera parts not essential to an understanding of the invention herein.

Referring now to FIGS. 1 and 2, camera 11 is a typical, simple camera in which roll film is selectively exposed by light entering the camera along its picturetaking axis 13. Lens 15, shutter 17 and aperture 19 (all illustrated in simplified, exploded fashion), are aligned along picturetaking axis 13. Roll film 21 may be conveniently loaded into camera 11, being advanced following each exposure by means of winding lever 23 which is attached by suitable ratchet and pawl means (not shown) to the camera's film winding mechanism. Camera 11 also has a shutter release lever 25, which, when depressed by the camera operator, rotates about pivot 27 to initiate the action of the camera's shutter drive mechanism (not shown) which, in turn, causes shutter blade 17 to rotate about pin 29, thereby momentarily uncapping aperture 19 and permitting the exposure of film 21 in a manner well known in the art.

As can be seen from FIG. 2, roll film 21 is provided with perforations 31 which have been previously punched through roll film 21 at predetermined metering intervals. Initially, and following each exposure, the camera operator moves winding lever 23 back and forth, thereby imparting uni-directional rotating motion to the camera's film winding mechanism in a counterclockwise direction. Ratchet wheel 33 is rigidly connected with the film take-up spool (not shown), and it also moves in a counterclockwise direction as film 21 is advanced by the winding mechanism in the direction of the arrow in FIG. 2.

The metering device herein includes a sensing member 35 which loosely engages pin 37 at notch 39. Spring 41, which is entwined around pivot 43 and is secured at one end by pin 45 and at the other end by arm 47 of sensing member 35, biases sensing member 35 in both a counterclockwise direction around pin 37 and, at the same time, away from the plane of travel of roll film 21.

Locking lever 51 is rotatably mounted on pivot 43 and is heavily biased in a clockwise direction (toward the film plane) by spring 53 which is also wrapped around pivot 43, having one end secured by pin 45 and the other by tab 55 of locking lever 51. Locking lever 51 has a cam surface 57 which rides against latching extension 59 of sensing member 35. Locking lever 51 also has a shutter lever blocking arm 61 which, when locking lever 51 is in the position as illustrated in FIG. 2, passes under shutter release lever 25, preventing the depression of lever 25 by the camera operator. Locking lever 51 is also provided with pawl arm 63 which is designed to engage and co-operate with ratchet wheel 33 whenever locking arm 51 is permitted to rotate in a clockwise direction under the influence of spring 53.

To facilitate explanation of the metering mechanism disclosed herein, further description will be made from the standpoint of its operation, and, to this end, attention is now called to FIGS. 3, 4, 5 and 6 which illustrate the pertinent parts shown in FIG. 2 in four sequential relationships which result in response to the operation of the mechanism.

Figure 3:
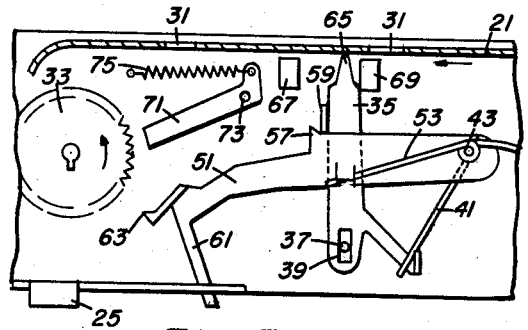
FIGS. 3, 4, 5 and 6 are plan views of the mechanism illustrating four sequential relative positions of various pertinent parts during the operation of the mechanism in the manner claimed and described.

Referring first to FIG. 3, it is assumed that the camera operator is winding roll film 21 (shown in cross section) in the direction of the arrow, ratchet wheel 33 moving with the camera's film take-up spool in a counterclockwise direction. In this position, nose 65 of sensing member 35 extends between stops 67 and 69. Sensing member 35 is held against stop 69 by the bias exerted on it by spring 41, while also being held with nose 65 against the surface of roll film 21 by the effect of locking lever 51 acting against latching extension 59 of sensing member 35. As was just explained above, locking lever 51 is biased in a clockwise direction and toward the plane of film travel by heavy spring 53.

Attention is called at this point to the fact that sensing member 35 does not transmit the full force of heavy spring 53 to the surface of film 21. Rather spring 41 provides a component of force tending to move sensing member 35 away from film 21, and this mitigates the effect of heavy spring 53, reducing the pressure exerted on film 21 by nose 65.

Attention is also called to high velocity pawl 71 (illustrated in FIG. 3 but omitted from FIG. 2 for purposes of clarity), which is shown in FIG. 3 in its cocked position to which it is moved in response to the cocking of the camera's shutter mechanism. High velocity pawl 71 is rotatably mounted on pivot 73 to rotate in a counterclockwise direction under the influence of spring 75 when released from its cocked position by a member of the shutter mechanism in a manner which, although not shown herein, is readily understood by one skilled in the art.

It should be further noted at this time that during the film winding period being described (namely, while film 21 continues to advance in the direction of the arrow and the various members of the device are maintained in the position illustrated in FIG. 3) and at all times following the last preceding exposure of the film by the camera operator, shutter lever blocking arm 61 of locking lever 51 lies across the path of shutter release lever 25, preventing any further exposure of film 21 until such time as film 21 has been sufficiently advanced by the camera's winding mechanism.

Figure 4:
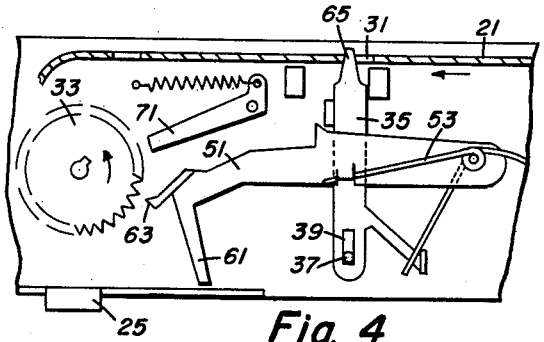

When film 21 has been advanced sufficiently to bring a perforation 31 into alignment with nose 65 of sensing member 35, the bias of spring 53 can move locking lever 51 in a clockwise direction, thereby driving sensing lever 35 through the plane of movement of film 21 until nose 65 extends through perforation 31 as shown in FIG. 4. In this position, the extending movement of sensing member 35 is arrested when pin 37 engages the rear portion of notch 39. The clockwise movement of locking lever 51 to a secondary cocked position in response to the passing of nose 65 through perforation 31, is not sufficient to permit pawl arm 63 of locking lever 51 to engage ratchet wheel 33, but it does withdraw shutter lever blocking arm 61 from the path of shutter release lever 25. Therefore, the penetration of nose 65 into the perforation 31 of itself does not arrest the movement of the camera's film winding mechanism, but is sufficient to allow operation of the camera's shutter.

Particular attention is called to this last described feature of the invention, since it serves an important dual-function. First of all, this assures that movement of sensing member 35 traverse the plane of movement of roll film 21 due to such causes as an uneven paper leader on the film, or momentary loss of film tension, will not result in false metering. Secondly: since, whenever there is no film in the camera, sensing member 35 will assume the extended position illustrated in FIG. 4, and since, as just noted, in this position pawl arm 63 does not engage ratchet wheel 33, permitting movement of the camera's winding mechanism, and blocking arm 61 does not block shutter release lever 25, permitting operation of the camera's shutter mechanism, this feature also assures that test operations may be made without necessitating loading film into the camera.

Because the winding mechanism is not blocked by the sensing of a perforation by nose 65, the operator continues to wind the film until the trailing edge of perforation 31 engages nose 65 of sensing member 35 and film 21 moves sensing member 35 in a counterclockwise direction around pin 37 in opposition to the influence of spring 41. This causes latching extension 59 of sensing member 35 to move (to the left in the illustrations) along cam surface 57 of locking lever 51. As soon as latching extension 59 is moved to the sharply indented portion of cam surface 57, locking lever 51 is momentarily released from the indirect counterclockwise force exerted upon it by spring 41, and it moves suddenly and with high velocity under the full force of spring 53 in a clockwise direction until pawl arm 63 of locking lever 51 engages ratchet wheel 33 to positively lock the camera's winding mechanism from further motion.

It should now be noted that while the effect of heavy spring 53 is mitigated by the force of spring 41 to prevent undue strain on film 21 by sensing member 35, the full force of heavy spring 53 is utilized to provide the required locking action.

It can be seen that other important features of the invention herein are achieved by the sudden release of locking lever 51 under the full force of spring 53 in the manner just described above. The velocity of locking lever 51, the distance through which it moves, and the force it exerts on rachet wheel 33 as it acts to block the camera's winding mechanism, are all (1) completely independent of the sensing mechanism, are (2) in no way related to the speed and force with which the camera operator drives the film winding mechanism of the camera, and are also (3) independent of the actual distance through which sensing member 35 moves. Therefore, it is possible with the invention herein to greatly magnify the relatively small and necessarily weak movements of the sensing member to provide positive locking action without concomitant strain on film 21.

The blocking of the film winding mechanism indicates to the camera operator that film 21 has been advanced sufficiently to permit another exposure to be made and that shutter release lever 25 may be selectively operated without fear of double exposure.

Figure 5:
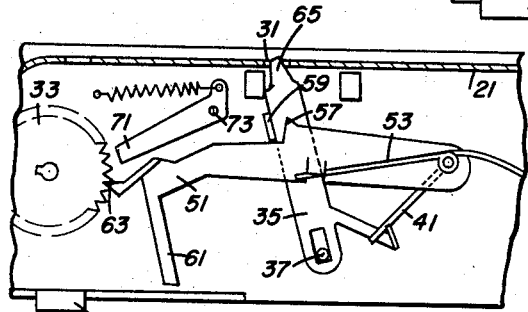
Figure 6:
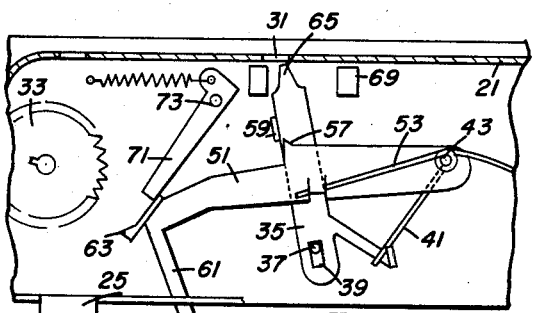

As was explained above, the cocking of the camera's shutter mechanism also cocks high velocity pawl 71 and latches it in the position illustrated in FIG. 5. When shutter release lever 25 returns to its original position following the camera operator's next selective exposure of film 21, the shutter mechanism (not shown) releases high velocity pawl 71 permitting it to rotate in a counterclockwise direction about pivot 73 under the influence of spring 75. As illustrated in FIG. 6, high velocity pawl 71 strikes locking lever 51 and rotates locking lever 51 against the influence of spring 53 in a counterclockwise direction about pivot 43. This movement of locking lever 51 away from the plane of movement of film 21 completely overcomes the indirect effect of spring 53 on sensing lever 35 which now moves solely under the influence of spring 41 in the following manner: sensing member 35 first moves away from the plane of movement of film 21, extricating nose 65 from film perforation 31 as illustrated by the position of sensing member 35 in FIG. 6. Sensing member 35 continues this contracting movement until such time as the leading edge of notch 39 engages pin 37, at which time the force exerted on sensing member 35 by spring 41 serves to rotate sensing member 35 in a clockwise direction about pin 37 until it contacts stop 69 and is in the position as illustrated in FIG. 3.

It should be noted that the counterclockwise movement of locking lever 51 under the influence of high velocity pawl 71 returns shutter lever blocking arm 61 across the path of shutter release lever 25 and also withdraws pawl arm 63 from ratchet wheel 33, thereby freeing the camera's film winding mechanism so that the camera operator can once again advance film 21, and at the same time preventing accidental operation of the camera shutter mechanism until such time as film 21 has been once again advanced sufficiently to operate the metering mechanism in the manner just described above.

In the preferred embodiment of the invention herein, the initial movement of winding lever 23 by the camera operator serves to cock the camera's shutter mechanism in a manner well known in the art, and this moves high velocity pawl 71 to its cocked position, permitting the various mechanism members to assume their initial positions as illustrated in FIG. 3.

It should be understood that only one specific embodiment of the present invention has been described herein, and that the particular form disclosed has been selected to facilitate the disclosure of the invention rather than to limit the particular form which the invention may assume. Further, it should be understood that various modifications, adaptations, and alterations may be applied to the specific form shown to meet various requirements of practice without in any manner departing from the spirit or the scope of the present invention.

What is claimed is:

1. In a film metering mechanism for a camera adapted to receive roll film perforated at predetermined metering intervals, said camera including
   (a) a picture-taking aperture,
   (b) a shutter mechanism for normally capping said aperture and for selectively and momentarily uncapping said aperture to expose said film when said shutter mechanism is released from a cocked condition, and
   (c) film driving means, including a ratchet wheel, for moving said film along a predetermined plane, the improvement comprising:
   (d) a resiliently mounted film sensing member movable from
      (1) a first position, contacting a surface of said film as it moves along said plane, through
      (2) an extended position traversing said film plane when intercepting at least one of said film perforations to
      (3) a second position, said sensing member being moved by said film from said extended position to said second position which is removed from said first position in the direction of film movement,
   (e) a spring, and
   (f) a locking pawl biased by said spring and responsive to the position of said sensing member, said locking pawl being movable from
      (1) a primary cocked position, in which said locking pawl is engaged by said sensing member and maintained out of locking relation with said ratchet wheel of said driving means, through
      (2) a secondary cocked position in response to the movement of said sensing member from said first position to said extended position, to
      (3) a released position in response to the movement of said sensing member from said extended position to said second position, said locking pawl engaging said ratchet wheel when in said released position to lock said film driving means to prevent further advancement of said film.

2. The combination according to claim 1 wherein said shutter mechanism includes a lever arm movable to a first position when said shutter mechanism is in said cocked condition and to a second position when said shutter mechanism is released to cause an exposure of said film, and wherein said locking pawl is returned from said released position to said cocked position by the movement of said lever arm from said first position to said second position.

3. The combination according to claim 1 including shutter blocking means interconnected with said locking pawl and responsive to the movement of said locking pawl for preventing the release of said shutter mechanism and the exposure of said film so long as said locking pawl is in said primary cocked position.

4. The combination according to claim 1 wherein said locking pawl has a cam surface for engaging said sensing member, said cam surface permitting sudden movement by said locking pawl to said released position only when said sensing member is moved from said intermediate position to said second position by the movement of said film along said plane.

5. The combination according to claim 2 wherein said spring acting on said locking pawl influences said sensing member toward said intermediate extended position, and including a second spring for biasing said sensing member away from said second position, said second spring being weaker than said first named spring, the effect of said first named spring upon said sensing member being mitigated by said second spring, and said sensing member being returned to said first position by the influence of said second spring when said lever arm is in said second position.

References Cited in the file of this patent

UNITED STATES PATENTS

| 1,369,753 | McMahon | Feb. 22, 1921 |
| 1,997,332 | Green | Apr. 9, 1935 |
| 2,275,791 | Mihalyi | Mar. 10, 1942 |
| 2,728,281 | Mihalyi | Dec. 27, 1955 |
| 2,819,664 | Elton | Jan. 14, 1958 |